Figure 1:
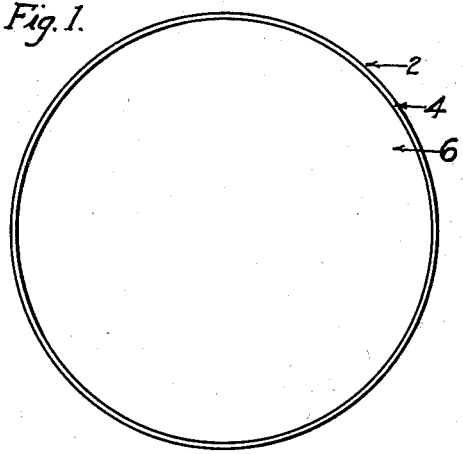

Feb. 18, 1941.  C. S. FOSTER  2,232,060
IDENTIFICATION INDICIA FOR HUNTERS, FISHERMEN, AND THE LIKE

Filed July 3, 1940

INVENTOR.
Clarence S. Foster

Patented Feb. 18, 1941

2,232,060

UNITED STATES PATENT OFFICE 2,232,060

IDENTIFICATION INDICIA FOR HUNTERS, FISHERMEN, AND THE LIKE

Clarence S. Foster, New Castle County, Del.

Application July 3, 1940, Serial No. 343,675

3 Claims. (Cl. 40—1.5)

This invention relates to identification indicia and, more particularly, to hunting and fishing licenses.

Using the license issued to fishermen and hunters as an illustration, but without limiting my invention thereto, it is customary for the authorized agency to issue a license in the form of a paper certificate showing the name and address of the licensee, together with his physical description, the purpose being to prevent transfer, and showing also the year date. Usually these are serially or consecutively numbered. In addition, a small button or metal plate correspondingly numbered is issued for visible identification. This identification sometimes takes the form of a fabricoid which is sewn to the coat. The button or fabricoid are standard and carry no individual identification, so that it is necessary for the game warden to call upon the hunter or fisherman to produce his individual license certificate carried in a wallet or card case tedious to remove. This is rarely done unless the officer has reason to suspect the wearer.

Such procedure of issuing licenses has certain disadvantages; for instance, there is considerable loss due to extra buttons having to be destroyed after the licensing period; there is difficulty in keeping the buttons in proper order so that they might readily be produced to go with the license form of a given number. There is also the difficulty of locating the license by the hunter at the time same is to be inspected by the warden. Attempts have been made to overcome this feature by placing the license in a container attached to the back of the button; however, such containers must necessarily be small and there is considerable difficulty in properly folding and inserting said licenses. Moreover, by removal and use or by becoming wet while being worn the license form becomes illegible and hence impractical for identifying the licensee.

It is an object of this invention to provide a license that will overcome all of the above disadvantages of the prior art licenses. Another object is to provide a new and improved identification indicia. Still another object is to provide an improved license that is water-proof and is exhibited in plain view of the public and cannot be changed without mutilation. Another object is to provide a new and improved article of commerce that may be used in the manufacture of such license. Still another object is to provide a method of manufacturing licenses that may be performed in the issuing office by the office clerk or stenographer. Another object is to provide a simple, economical and direct process for issuing hunting and fishing licenses. Other objects will be apparent from the following description of the invention.

Figure 2:
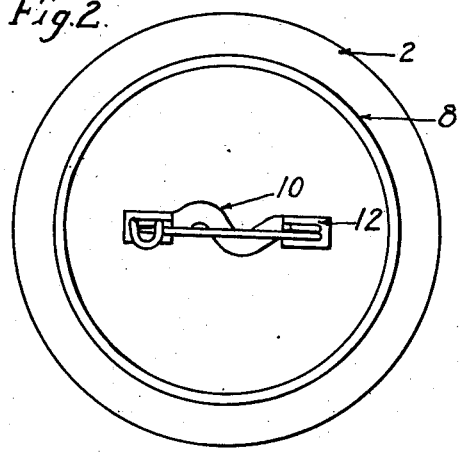
Figure 3:
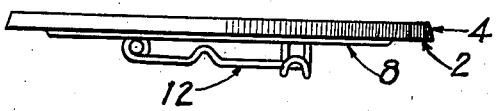
Figure 4:
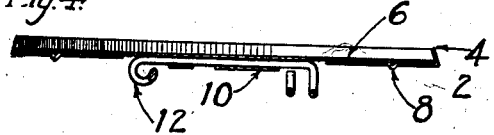
Figure 5:
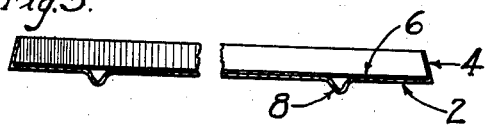
Figure 6:
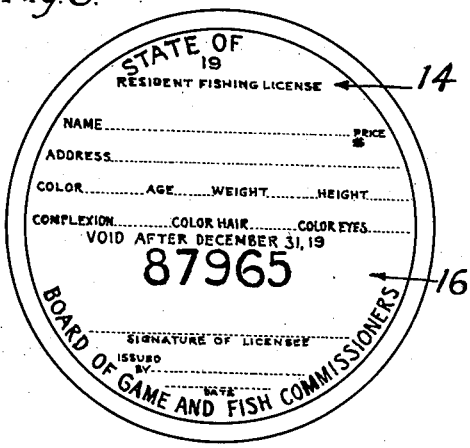
Figure 7:
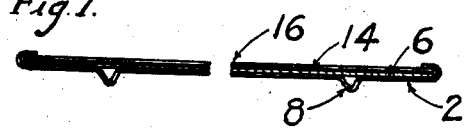

These objects are accomplished by the following invention which can best be described by reference to the drawing. In the drawing Figure 1 is a front elevation of the license holder prior to completing the manufacture of same into the license. Figure 2 is a rear elevation of such a holder. Figure 3 is a side elevation of such a holder. Figure 4 is a horizontal section of the holder. Figure 5 is an enlarged partial horizontal section of the holder. Figure 6 is a face view of the assembled license and Figure 7 is an enlarged partial horizontal section of said assembled license.

The numbers on the various figures are consistent throughout in referring to the same part of said license. In the drawing 2 designates a metal holder having a flange 4 and a metal filler plate 6. On the back of said holder 2 there is a circular protrudence 8. This protrudence serves to double the purpose of reinforcing the holder and forming a centering means for holding the holder into a press at the time the licence is assembled. The protrudence need not be round but may take any shape as long as it accomplishes these results. In the preferred embodiment of this invention when using a disk of approximately 2½" diameter, this protrudence is about $\frac{1}{32}$" high and about $\frac{1}{16}$" wide and is located approximately ¼" from the outer edge of the holder. In the center of the back of said holder there is another protrudence 10 which terminates in two holes through the disk. This protrudence serves to locate and hold into position the means for fastening the holder to the garment of the licensee. This means, as shown in the drawing, is a bent wire spring clip 12; however, any similar means may be so used. In the front or opposite side of the holder is a flat metal disk of substantially the same size and of similar shape as the front planal face of the holder tube. This disk fits against said face and serves to hold the pin clip in place and provide a back for the paper license.

In assembling the holder, disk and pin fastener the holder 2 is first stamped with the flange 4 at right angles to the face. The pin fastener 12 is then put in place and the disk 6 inserted over the face of the holder 2. The flange 4 is then bent inward to about 15° from its original perpendicular position. This serves to prevent the disk 6 from becoming separated from the holder 2.

In the preferred embodiment of this invention the disk is of a metal of about 0.10" in thickness and the flange is approximately $\frac{3}{32}$" high. The heighth of the flange will of course depend upon the thickness of the license and Celluloid cover as well as upon the thickness of the disk 6. 14 indicates a circular license certificate and 16 a transparent water-proof cover.

At the time of issuing the license the issuing officer has in stock the assembled holder as shown in Figures 1 through 5, inclusive. The officer makes out the license form 14 and slips same into the assembled holder. Over this license form the officer places a flexible transparent sheet such as Celluloid or waterproof Cellophane, the license form and the transparent sheet each being cut to substantially the same size as the metal disk 6. It is preferred that the transparent sheet be made of a material about 0.0075" thick. The license thus assembled is then placed in a simple screw press, centered and held in the press by means of the protrudence 8. The press consists merely of a base made to receive and center the holder 2 with a flat plane surface above for descending and crimping the flange 4. The license assembly is completed by performing this crimping action. The metal disk 6 in the assembled license serves to make the license waterproof, furnishes a solid plane backing for the licence form, stiffens the license, holds the wire clip in place, and aids in the forming of a smooth crimped flange.

It has been found that the metal holder 2 should be made of a tin plated cold-rolled cold-strip steel and should be of Grade No. 3 or 4. No. 3 grade, a quarter-hard strip steel, has the following characteristics:

Hardness, Rockwell "B scale"_____ 69±5
Depth of cup for 0.050 in. thickness _____mm__ 8 to 9
Tensile strength_____p. s. i__ 54,000±6000
Elongation in 2 in. for 0.050 in. thickness _____per cent__ 20±7
Bends 180° across grain and 90° along grain.

No 4 grade, a soft or planished strip steel, may be characterized as follows:

Hardness, Rockwell "B scale"_____ 58±6
Depth of cup for 0.050 in. thickness_____mm__ 9 to 10.5
Tensile strength_____p. s. i__ 48,000±5,000
Elongation in 2 in. for 0.050 in. thickness _____per cent__ 30±6
Bends 180° both ways of the grain.

It is preferable to use a material having a bend of 180° across the grain and 130° along the grain. The thickness of the metal in holder 2 should be within the range of 0.008" and 0.015" and have the property so that the flange 4 will require a pressure of from 85 to 150 lbs. per linear inch to bend same from the 15° vertical angle to the horizontal position at the time that said flange is crimped. This pressure in terms of the crimping of the usual 2½" disk amounts to a pressure between 700 and 1200 lbs., which can be normally handled in a small inexpensive screw type hand press. The metal in the holder need not be sheet steel but may be any metal which has characteristics similar to that noted above for sheet steel. The holder need not be circular but may take any form, such as elliptical, as long as the flange 4 is continuous and hence after crimping cannot be again returned to its original position without mutilation.

Since the license certificate is permanently secured within the holder and the description of the licensee together with his signature is on the face of the license, there is little or no chance for the license being transferred from one person to another which is a common practice under the existing system.

Under my system, the unused holders can be used from year to year and the only loss will occur in left-over license forms which represent a very small part of the cost. The utilization of the agent to complete the license is practical and so simple that no particular experience is required.

Although I have used a fishing or hunting license for the purpose of illustration, it is obvious my invention will extend to other uses where the problem is similar, and I do not desire to limit my invention to the specific embodiment illustrated.

As many apparently widely different embodiments of this invention may be made without departing from the spirit and scope thereof, it is to be understood that I do not limit myself to the specific embodiments thereof except as defined in the appended patent claims.

I claim:

1. As a new article of manufacture a device adaptable for exhibiting hunting and fishing licenses which comprises in combination a holder with means for attaching to the back thereof fastening means for fastening said holder to the licensee, said holder having a protruding groove in the back thereof concentrically located so as to reinforce against bending as well as providing centering means for placing said holder in a press, said holder having a continuous flange at the edge thereof extending to the front of said holder, means for attaching said holder to the garment of the licensee affixed in the back of said holder, a metallic sheet of substantially the same size and shape as the face of said holder adjacent to the face of said holder, said flange extending inwardly about 15° from a line perpendicular to the face of said holder to hold the metal sheet in place adjacent to said face, said holder being characterized as being made of a metal sheet having properties within the range of Grade No. 3 and Grade No. 4 tin plated cold rolled strip steel and being between 0.008" and 0.15" thick, said flange having the property of requiring a compression strength per linear inch of from 85 to 150 lbs. to bend same from the 15° angle through 75° to a plane horizontal to the face of the holder and said metal disk having at hickness of the same order as that of the metal holder.

2. A personal identification device comprising in combination a metal holder having means for attaching same to a garment, a metal sheet of substantially the same size and shape as the inner face of said holder within said holder adjacent to said face of said holder, a personal identification card adjacent to said metal sheet and a transparent water-proof window seated over said identification card, said metal disk, identification card and window being secured against the back of said holder by means of a continuous crimped flange at the edge of said holder, said holder being characterized as being made of a metal sheet having properties within the range of Grade No. 3 and Grade No. 4 tin plated cold rolled strip steel and being between 0.008" and 0.15" thick, said flange having the property of requiring a compression strength per linear inch of from 85 to 150 lbs. to bend same from a 15° angle through 75° to a plane horizontal to the face of the holder and said holder having a protruding groove in the back thereof concentrically located so as to reinforce against bending as well as provide centering means for placing said holder in a press at the time of crimping the flange.

3. The holder described in claim 1 characterized in that said holder is circular and approximately two and one-half inches in diameter and said continuous flange is approximately three-thirty-seconds inch high.

CLARENCE S. FOSTER.